United States Patent [19]
Whitney

[11] 4,322,936
[45] Apr. 6, 1982

[54] SELF CLEARING RAKING ATTACHMENT FOR MOWER

[76] Inventor: Sherwood W. Whitney, Rte. 6, Box 214-A, Okeechobee, Fla. 33472

[21] Appl. No.: 232,726

[22] Filed: Feb. 9, 1981

[51] Int. Cl.³ .................... A01D 7/00; A01D 51/00
[52] U.S. Cl. .................... 56/16.1; 56/400.09
[58] Field of Search .............. 56/16.1, 228, 400.09, 56/400.12, 400.1, 400.08, 395, 396, 397, 398, 400.19, 364

[56] References Cited

U.S. PATENT DOCUMENTS

| 684,909 | 10/1901 | Barber | 56/397 |
|---|---|---|---|
| 959,796 | 5/1910 | Pearson | 56/395 |
| 1,817,361 | 8/1931 | Garretson | 56/395 |
| 2,842,930 | 7/1958 | Pagley | 56/400.08 |
| 2,898,724 | 8/1959 | Robinson | 56/16.1 |
| 3,438,183 | 4/1969 | Puretic | 56/16.1 |
| 3,765,159 | 10/1973 | Neff | 56/396 |
| 4,018,038 | 4/1977 | Sipe | 56/400.12 |
| 4,171,606 | 10/1979 | Ziegler et al. | 56/364 |

FOREIGN PATENT DOCUMENTS

2619106 11/1976 Fed. Rep. of Germany ........ 56/228

Primary Examiner—Paul J. Hirsch

[57] ABSTRACT

The invention relates to a raking device which includes a raking head composed of a plurality of raking tines which are moved over the ground, adapted for coupling same to a riding lawn mower or other suitable vehicle for propulsion power and providing means for a riding operator. The invention additionally providing a unique means of unloading the rake and clearing the tines of clogged material, serving greatly to expedite the completing of the raking operation.

3 Claims, 4 Drawing Figures

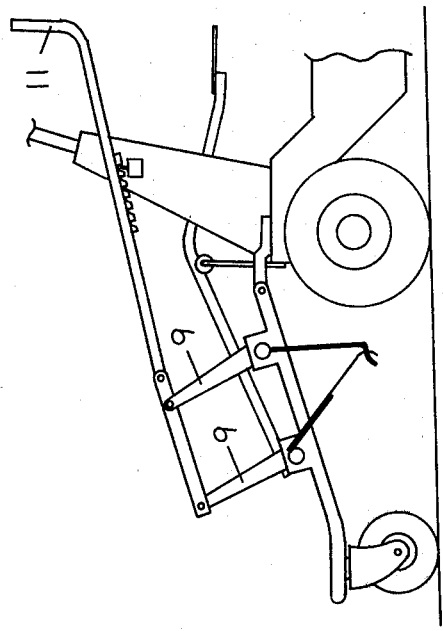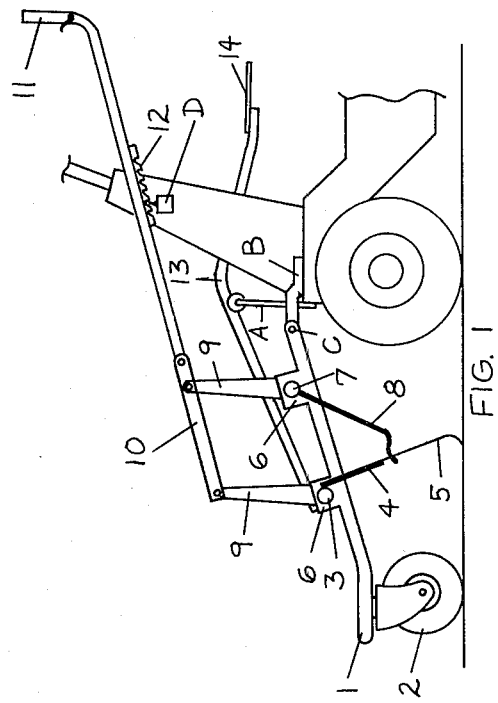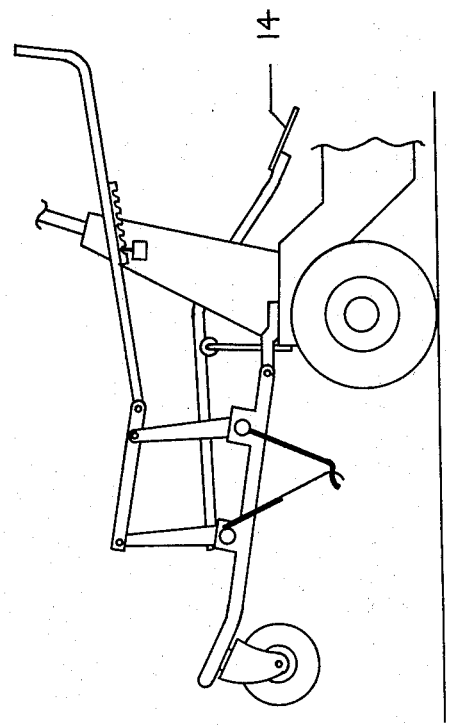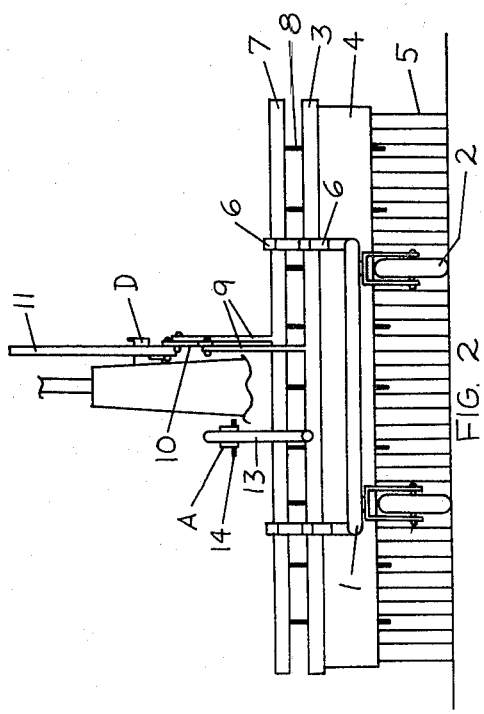

SELF CLEARING RAKING ATTACHMENT FOR MOWER

The present invention relates to new and useful improvements in yard rakes, incorporating in its construction features which effect the gathering of leaves, pine needles, etc. in an absolute minimum of time and with a minimum of manual labor. The foregoing is achieved by virtue of the fact that the rake tines are cleared semi-automatically after each raking pass over the ground in a manner which is believed unique and is fully described later in this specification, and the fact that the rake, at the same time is unloaded and is ready for the succeeding pass. The time and labor saving element is also aided by the fact that the rake, used in its most commonly anticipated manner, will be propelled, such as, by a riding lawn mower as shown in the drawings, allowing for larger and heavier loads (as compared to hand raking) and will cover the area to be raked at a faster pace (as compared to hand raking). It has been found that when rake tines become clogged, merely raising the rake off the ground does not clear the rake of clogged leaves, etc., so that continued raking may proceed. The present invention clears the rake by causing a comb-like structure to sweep through the rake between the tines at the end of the raking pass. The inventor believes that a rake as described will be of great advantage to the worker faced with the task of raking, especially a larger yard. Further advantage may be gained by the fact that the rake will not remove from the ground agents such as fertilizer and insecticides previously applied, as would be the case where such methods as vacuum baggers are employed to remove unwanted ground cover. These and other objects of the invention will become more apparent as this specification proceeds. In the drawings forming a part hereof, the rake is, in each view, shown attached to the front end of a riding lawnmower.

An explanation of the various views follows:

FIG. 1 is a side view, showing the rake in raking position.

FIG. 2 is a front view, also shown in raking position.

FIG. 3 is a side view, showing the rake raised and cleared for backing, the tines cleared of clogged material.

FIG. 4 is a side view showing the rake tines raised off the ground and cleared by advancing the arms 9 forward.

Referring now specifically to the drawings, the numeral 1 is a generally U shaped chassis, most conveniently formed of tubular steel. The numeral 2 designates a small wheel of the type that is free to swivel, bolted securely to the leading end of the chassis. The numeral 3 identifies a shaft to which the part, numeral 4 is attached (as by welding), this part being that to which the rake tines, numeral 5, are attached (as by riveting or bolting). The shaft 3 is mounted crosswise of the chassis 1 in bearings, numeral 6, and is free to assume a partially rotatable motion. The numeral 7 designates a shaft onto which is secured at right angles thereto a plurality of finger-like pieces designated by the numeral 8, the combination forming, in effect, a comb-like structure. The finger-like pieces are so arranged as to extend downward, one piece into the space between every fourth or fifth tine. It should be noted that the finger-like pieces, numeral 8, are so formed that the ends of the same remain substantially perpendicular to the tines as they move down the tines, thus effecting an easier, more thorough clearing of the tines. The shaft 7 is also mounted crosswise of the chassis in bearings and parallel to shaft 3 and is also free to assume a partially rotatable motion. The numeral 9 designates a rigid arm, one being attached at right angles to each of the shafts 3 and 7, extending outwardly therefrom and bridged together with a part designated by the numeral 10, using pins which allow for pivoting. This interconnecting of the two shafts is for the purpose of maintaining the desired relative degree of rotation of the shafts and thereby the relative position of the fingers of shaft 7 and the rake tines of shaft 3 is maintained. Numeral 11 designates a handle-like piece, connected to the bridging 10, extending rearward to within access of the operator. This handle is provided with a series of notches, numeral 12, for the purpose of finely adjusting the angle of the rake tines to that of the ground by extending the handle forward or backward and may be locked into position, as shown, at a point on the steering post of the mower. The numeral 13 is a lever, the load arm of which is attached to the shaft 3 by means of a ring arrangement so as not to restrict the rotation of the shaft. The effort arm of the lever extends rearward to within access of the operator with a footpedal 14 attached. The part identified by the letter A is the fulcrum of lever 13 and is so identified because it is permanently attached to the mower as opposed to being attached to the preferred embodiment described here, but which may take some variation in form which falls within the scope and spirit of this invention. The letter B is a bracket, a pair of which is permanently attached to the mower and to which the rake chassis is coupled by means of pins or bolts, letter C, allowing for freedom of the rake to follow the contour of the ground. The letter D identifies a stop, mounted on the steering post of the mower for the purpose of locking the handle 11 in the desired position by engaging with the appropriate notch of numeral 12. As is the case with the fulcrum, letter A, the bracket B and the stop D, with some variation of the preferred embodiment shown, take a different form without departing from the spirit of the invention.

The advantages of accomplishing the raking operation with the rake in front of the forward looking operator, as opposed to pulling the rake which would require that the operator face rearward, are obvious. With a rake of the character described here, normal operation would be to push the accumulation of leaves after each raking pass to a central collection point. Since yard rakes with somewhat flexible tines cannot be moved over the ground in a reverse direction without damaging the tines, the rake is now raised off the ground, as in FIG. 3, by depressing the foot pedal 14. When the rake is raised the shafts 3 and 7 travel in an upward arc about pin C and handle 11 rotates about stop D (the position of notches 12 relative to stop D may be adjusted without affecting the basic operation of the self clearing mechanism) causing the arms 9 to rotate counter-clockwise relative to shafts 3 and 7, causing tines 5 and fingers 8 to move from the raking position shown in FIG. 1 to the cleared position shown in FIG. 3. This movement causes the fingers of structure 8 to move down the tines 5 pushing clogged material therefrom. The rake is then backed away from the central collection point, is lowered to the ground and is ready for the next raking pass.

FIG. 4 shows how the tines may be cleared of clogged leaves and the rake unloaded without raising the rake off the ground by advancing the handle 11 forward, where this might be desirous in an unusual situation.

While a preferred embodiment of the invention has been described using specific terms, such description is for illustrative purposes only and it should be understood that changes and variations may be made without departing from the scope and spirit of the invention in which the following are claimed as new:

1. A self-cleaning raking attachment for the front end of a riding lawn mower or other powered vehicle comprising;

a generally U-shaped frame member having a forward end and a rearward end, means at the rearward end for coupling said frame member to the front end of said mower or said vehicle, a pair of swivel wheels mounted at the forward end of the frame member for supporting said attachment above the ground, a first and a second shaft member mounted transversely of the frame and mounted on said frame member spaced from each other in a forward and reward direction, a first set of tines attached to said first shaft member, a second set of rigid finger-like tines attached at right angles to said second shaft member to form a comb-like structure, each of said tines of said second set extending between the tines of the first set, means mounting said first and second shafts permitting partial rotation of said shafts, a first and second arm extending radially upward from each of said shafts, a third arm rotatably connected to each of said first and second arms by pins forming a parallel linkage with said frame member, a handle extension arm connected to said third arm extending rearward for adjusting the degree of rotative angle of said shafts, a lift arm secured to said frame member for raising the frame member, said lift arm extending rearward, a foot pedal mounted at the rear of the lift arm for control by an operator, a fulcrum element mounted fixed relative to said mower or said vehicle and operably extending to said lift arm providing the fulcrum point for lifting said frame, whereby upon lifting of said frame by said operator cleaning of the first set of tines is accomplished by said second set of tines.

2. A raking attachment as in claim 1 including locking means operable between the mower and said handle extension arm for adjustable securement of a selected position of said handle extension arm.

3. A raking attachment as in claim 1, whereby cleaning of said first set of tines is also accomplished by forward movement of said extension arm.

* * * * *